US009354615B2

(12) United States Patent
Lin et al.

(10) Patent No.: US 9,354,615 B2
(45) Date of Patent: May 31, 2016

(54) DEVICE, OPERATING METHOD AND COMPUTER-READABLE RECORDING MEDIUM FOR GENERATING A SIGNAL BY DETECTING FACIAL MOVEMENT

(71) Applicant: UTECHZONE CO., LTD., New Taipei (TW)

(72) Inventors: Po-Tsung Lin, New Taipei (TW); Chih-Heng Fang, New Taipei (TW); Chia-Chun Tsou, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 93 days.

(21) Appl. No.: 14/296,110

(22) Filed: Jun. 4, 2014

(65) Prior Publication Data

US 2014/0376772 A1   Dec. 25, 2014

(30) Foreign Application Priority Data

Jun. 24, 2013   (TW) .............................. 102122408 A (51) Int. Cl.
| | |
|---|---|
| G08B 23/00 | (2006.01) |
| G06K 9/00 | (2006.01) |
| G05B 1/01 | (2006.01) |
| G08B 21/04 | (2006.01) |

(52) U.S. Cl.
CPC .............. *G05B 1/01* (2013.01); *G06K 9/00335* (2013.01); *G06K 9/00832* (2013.01); *G06K 9/00838* (2013.01); *G06K 9/00845* (2013.01); *G08B 21/0476* (2013.01)

(58) Field of Classification Search
None
See application file for complete search history.

(56) References Cited

U.S. PATENT DOCUMENTS 5,795,306 A * 8/1998 Shimotani ............ A61B 5/1103
600/558

(Continued)

FOREIGN PATENT DOCUMENTS

TW            565754 B        12/2003

OTHER PUBLICATIONS

Azim et al., "Automatic Fatigue Detection of Drivers through Yawning Analysis", Signal Processing, Image Processing and Pattern Recognition, vol. 61 of the series Communications in Computer and Information Science, pp. 125-132.*

*Primary Examiner* — Matthew Bella
*Assistant Examiner* — Jose M Torres
(74) *Attorney, Agent, or Firm* — Muncy, Geissler, Olds & Lowe, P.C.

(57) ABSTRACT

A device for generating signal by detecting facial movement and operating method thereof is provided, which includes: an image capture unit, and a processing unit. The image capture unit for obtaining an image series. The processing unit receives the images series from the image capture unit, wherein the processing unit includes an image background removal module, an image extracting module, and a comparator, wherein the image background removing module processes each of the image series respectively to obtain a facial image, wherein the feature location module determines a location of a pair of nostrils in the facial image, defines a mouth searching frame, and acquires a data of mouth movements through the mouth searching frame, wherein the comparator compares the data of mouth movements with predetermined facial information, and generates a designated signal according to the comparison result.

14 Claims, 6 Drawing Sheets

(56) References Cited

U.S. PATENT DOCUMENTS

| | | | | |
|---|---|---|---|---|
| 2006/0161315 | A1* | 7/2006 | Lewis | G08G 1/20 701/1 |
| 2008/0150734 | A1* | 6/2008 | Johns | A61B 5/18 340/575 |
| 2009/0244274 | A1* | 10/2009 | Morita | G06K 9/00248 348/78 |
| 2010/0014759 | A1* | 1/2010 | Suzuki | G06K 9/00248 382/195 |
| 2010/0202658 | A1* | 8/2010 | Ishida | A61B 5/18 382/103 |
| 2013/0076881 | A1* | 3/2013 | Takahashi | G06K 9/00268 348/77 |
| 2013/0176129 | A1* | 7/2013 | Li | A61B 5/18 340/575 |
| 2013/0194107 | A1* | 8/2013 | Nagata | B60Q 9/00 340/904 |
| 2013/0226408 | A1* | 8/2013 | Fung | B60W 40/09 701/41 |
| 2013/0332160 | A1* | 12/2013 | Posa | G06F 3/013 704/235 |
| 2013/0335228 | A1* | 12/2013 | Kawano | G08G 1/16 340/575 |

* cited by examiner

DEVICE, OPERATING METHOD AND COMPUTER-READABLE RECORDING MEDIUM FOR GENERATING A SIGNAL BY DETECTING FACIAL MOVEMENT

BACKGROUND OF THE INVENTION

1. Field of the Invention

The present invention relates to a device for generating a signal by detecting facial movement and operating method thereof. In particular, the present invention relates to a device and an operating method for determining the intention of a user by detecting his/her mouth movement and generating a corresponding signal.

2. Description of the Related Art

There are many joints in human hands so that diverse actions can be made. Thus, general machines or vehicles are designed for manual operating, such as keyboards, steering wheels, buttons, holders, etc. However, some physically disabled persons can not operate those devices designed for manual operation thereby causes many problems of daily living. On the other hand, even a non-physically disabled persons sometimes are under the conditions of failing to operate a device by their hands, such as when they are lifting heavy loads with both of hands and are difficult to open a door, when they are driving and using a cell phone at the same time is prohibit to ensure safety, or when a user is suffering a kidnapping and shall make a non-obvious way to seek help. Therefore, many manufacturers are racking their brains to find a solution to the problem of how to interact with an electronic device without using hands.

By comparison with hands, human's face can also be controlled to have various expressions. Unlike hands, the facial actions cannot operate the devices by directly contact actions, such as pushing, pressing, pulling, etc.; however, with the development of image processing technologies, there has been developed some technologies which analyze the facial movements for generating a signal to operate electronic devices. For example, Taiwan patent No. 565754 discloses an eye-controlled driving assistant system, which controls the tools, such as electrical wheel chair, by detecting eyes movement. Therefore, even a physically disabled person can drive an electric wheelchair with a simple operating method. The system captures the image of eyes effectively, and computes the exact coordinate location on the screen, and a user controls the driving of the vehicles by winking actions which works as a signal to the system. However, the eyes action is not as nimble as hands action. The movement of eyes action is only monotonous moving around, opening and closing, thus the expressions of eyes actions are limited. In addition, when a user is under an accident or is being coerced, the user needs a simple way to seek help by facial movements. In respect to the prior art, the signals can only being used to assist driving system, but is unable to deliver such complicated message. Therefore, it is known that the existing technology of detecting facial movement for generating signal has such a problem that it is difficult to express a complicated intention and is also difficult to transmit massages. To this problem, the prior art have not provided an effective solution.

SUMMARY OF THE INVENTION

The purpose of the present invention is to overcome the shortcomings of the prior art that it is difficulty to express complicated intention and is unable to send out the signal to seek help.

To solve the above mentioned problem, the present invention is to provide a device for generating signal by detecting facial movement, comprising: an image capture unit for obtaining an image series; and a processing unit for receiving the images from the image capture unit wherein the processing unit includes an image background removal module, a feature location module, and a comparator, wherein the image background removal module processes each of the image series respectively to obtain a facial image, wherein the feature location module determines a location of a pair of nostrils in the facial image, defines a mouth searching frame, and acquires a data of mouth movements through the mouth searching frame, wherein the comparator compares the data of mouth movements with a predetermined facial information, and generates a designated signal according to the comparison result.

Another preferred object of the invention is that the said data of mouth movements includes a coding sequence based on opening and closing of mouth in the facial images of the image series, and the predetermined facial information is a default coding sequence stored in a storing unit.

Another preferred object of the invention is that the said data of mouth movements includes a lips shape coding sequence generated by a plurality of lips shapes in the facial images of the image series, and the predetermined facial information is a default lips shape coding sequence stored in the storing unit.

Another preferred object of the invention is that the said device further comprises a signal transmitting unit that receives the designated signals generated by the comparator and transmits the designated signals to a designated device.

Another preferred object of the invention is that said signal transmitting unit includes a mobile communication module or a Wi-Fi module, and wherein the designated device includes a base station, an automobile service center, a security center, or an emergency contact.

Another preferred object of the invention is that the said device further comprises a global positioning system (GPS) module that transmits a location information to the designated device through the signal transmitting unit after the signal transmitting unit transmits the designated signals.

Another preferred object of the invention is that the said device further comprises an on-board diagnostics (OBD) that records and transmits driving information to the designated device through the signal transmitting unit after the signal transmitting unit transmits the designated signals.

Another preferred object of the invention is that said device further comprises a video recorder that records a video of an interior and/or exterior of a vehicle after the signal transmitting unit transmits the designated signals.

Another preferred object of the invention is that the said device furthers comprises an alarm unit that sends out a warning when a wink counting module of the processing unit determines that the number of winks in the image series during a stipulated time surpasses a first threshold value.

Another preferred object of the invention is that the said device further comprises an alarm unit that sends out a warning when a face turning detecting module of the processing unit determines that an angle of face turning of the facial images in, the image series during a stipulated time surpasses a second threshold value.

Another aspect of the present invention is to provide a method for generating signal by detecting facial movement, executed in an electronic device, wherein the method comprises the following steps: capturing an image series, and identifying a facial image through each of the image series; determining a pair of nostrils anchor point through the facial image; setting a mouth area based on the nostrils anchor point; recording images of the mouth area in a stipulated time to acquire a data of mouth movements; and comparing the data of mouth movements with at least one predetermined facial information, wherein when the data of mouth movements matches the predetermined facial information, generating a designated signal in correspondence with the predetermined facial information.

Another preferred object of the invention is that the said step of setting a mouth area based on the nostrils anchor point includes: setting a mouth searching frame based on the nostrils anchor point, and adjusting the contrast inside the mouth searching frame to acquire an enhanced image; despeckling the enhanced image to acquire a despeckled image; edge sharpening the despeckled image to acquire a sharpened image; binarizing the sharpened image to acquire a binarized image; and edge sharpening the binarized image again, and extracting a mouth area in the mouth searching frame.

Another preferred object of the invention is that the said step of recording images of the mouth area in a stipulated time to acquire a data of mouth movements includes: extracting a plurality of mouth features from the mouth area, wherein the mouth features include an upper lip and a lower lip; comparing the distance between the upper lip and the lower lip with a gap value; if the distance is bigger than the gap value, acquiring an image of opening movement; if the distance is smaller than the gap value, acquiring an image of closing movement; generating a code according to the image of closing movement or opening movement, and storing the code in the column N of a coding sequence; determining whether the stipulated time is reached; and storing the coding sequence in the data of mouth movements.

Another preferred object of the invention is that the said step of recording images of the mouth area in a stipulated time to acquire a data of mouth movements includes: comparing the images of the mouth area with a plurality of patterns; if the results of comparison match, generating a lips shape code, and storing the lips shape code in the column N of a coding sequence; determining whether the stipulated time is reached; and storing the coding sequence into the data of mouth movements.

Another preferred object of the invention is that the said method further includes a step after generating the designated signals: transmitting the designated signal to a designated device through a signal transmitting unit; wherein the signal transmitting unit is a mobile communication module or a Wi-Fi module installed in a vehicle, and the designated device is a base station, an automobile service center, a security center, or an emergency contact.

One aspect of the present invention is to provide a non-transitory computer-readable recording medium, which stores a computer-executable command and which includes a method that can operate on an electronic device to detect the facial movements of users for generating a signal, wherein the method includes above mentioned method of the present invention.

Therefore, the present invention attains the following benefits:

1. The device for generating signal by detecting facial movement acquires the data of mouth movement through the facial image of the user and compares the data of mouth movement with the predetermined facial information which is pre-stored in the storing unit, and if the results of comparison is match, then the signal transmitting unit transmits the designated signal in correspondence with the predetermined facial information to a designated device. Therefore, if a user is trapped in an accident or is coerced, the user can seek help in a simple and non-obvious way by the device which detects the user mouth movement and generates a distress signal.

2. When the device for generating signal by detecting facial movement is installed in a car or other vehicles, the signal transmitting unit transmits the designated signal to the designated device, and the global positioning system module and the on-board diagnostics also sends the location information of the user and the driving data together through the signal transmitting unit to the staff nearby the designated device so that the user's situation can be understood quickly and distinctly.

3. The present invention determines the driver's attention by comparing the numbers of wink and face turning with the first threshold value and the second threshold value respectively. Therefore, the present invention can be applied to vehicles for preventing the distraction of a driver and reducing the accident rates.

To improve understanding of the invention of the disclosure, the techniques employed in the patent invention to achieve the foregoing problems, characteristics and effects thereof are described hereinafter by the way of examples with reference to the accompanying drawings.

DETAILED DESCRIPTION OF THE PREFERRED EMBODIMENTS

In the following detailed description, only certain exemplary embodiments of the present invention are shown and described, by way of illustration. As those skilled in the art would recognize, the described exemplary embodiments may be modified in various way all without departing from the spirit or scope of the present invention. Accordingly, the drawing and description are to be regarded as illustrative in nature, and not restrictive.

The technical contents of the present invention will become apparent with the detailed description of preferred embodiment.

The terms "a" and "an" refer to one or to more than one (i.e., to at least one) of the grammatical object of the article.

Figure 1:
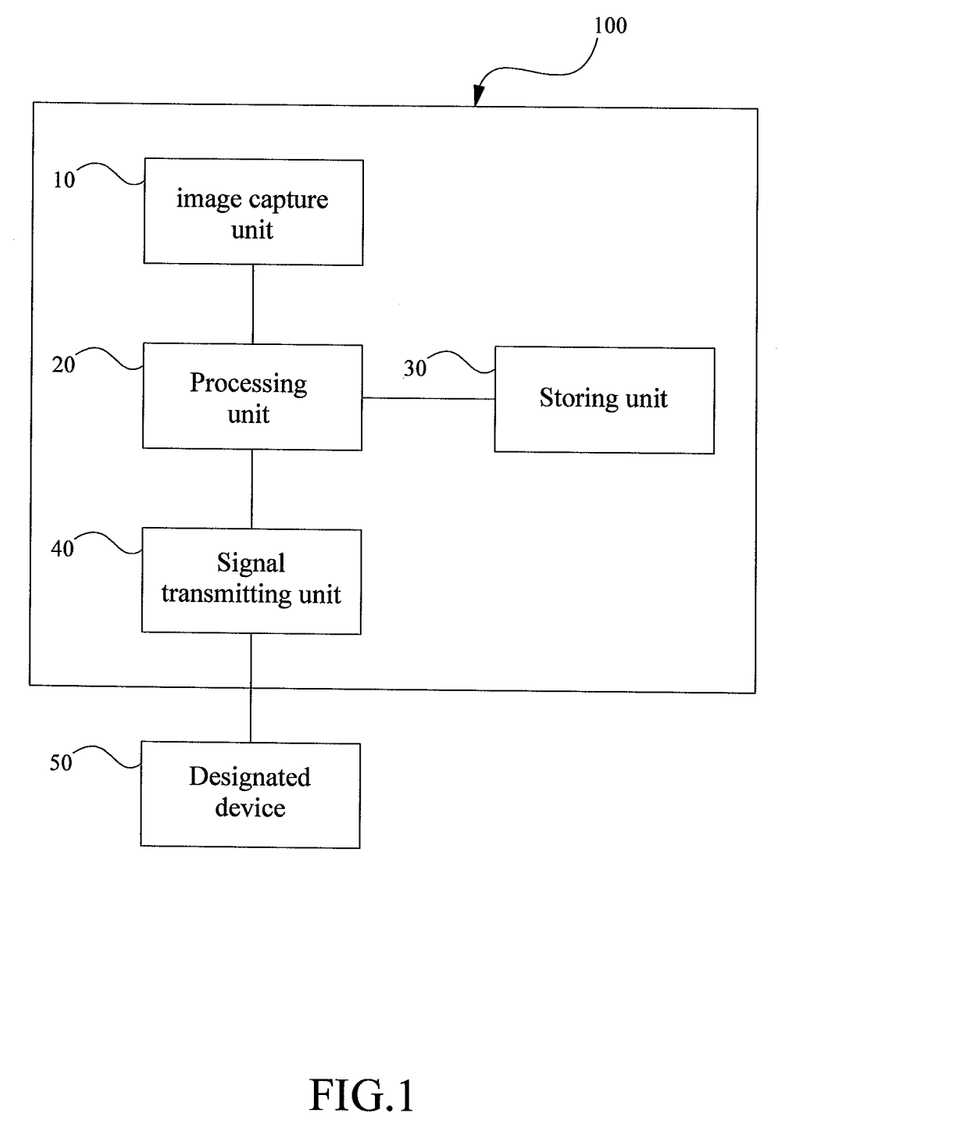
FIG. 1 shows a block diagram of the device for generating signal by detecting facial movement of the present invention.
Figure 2:
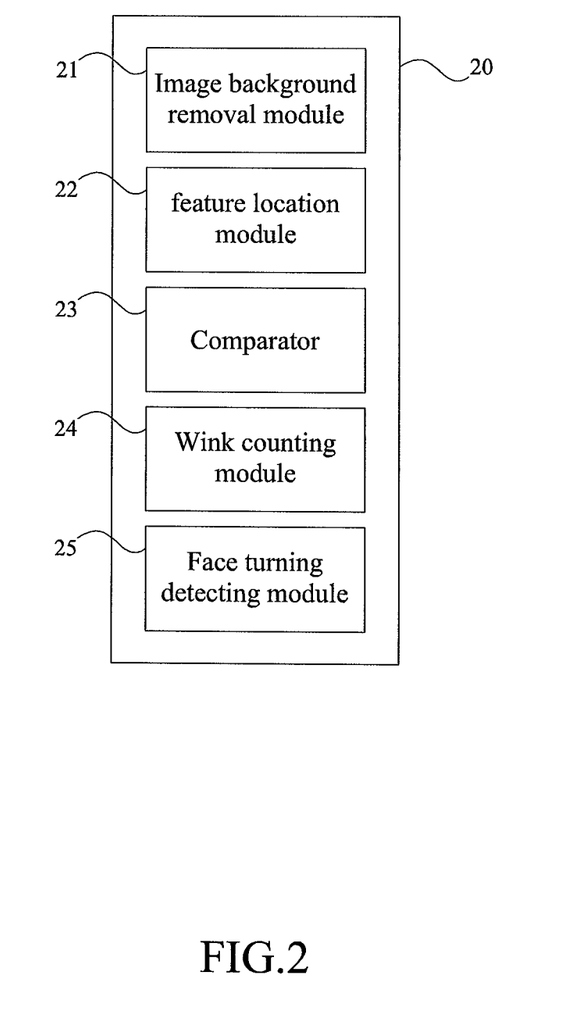
FIG. 2 shows a block diagram of the processing unit of the present invention.

Regarding the techniques of the present invention, please refer to the FIG. 1 and FIG. 2. FIG. 1 shows a block diagram of the device for generating signal by detecting facial movement of the present invention, and FIG. 2 shows a block diagram of the processing unit of the present invention. As shown in the figures, the present invention provides a device for generating a signal by detecting facial movement 100, which is able to be installed in many kinds of electronic equipments. For example, the device for generating signal by detecting facial movement 100 can be installed in a vehicle to detect the facial movement of a driver. If the facial movement of the driver matches the predetermined facial information, the device for generating signal by detecting facial movement 100 generates a signal corresponding to the predetermined facial information, and the signal is send to a designated device. The device for generating a signal by detecting facial movement 100 includes an image capture unit 10, a processing unit 20, and a storing unit 30.

The image capture unit 10 successively takes pictures to acquire a plurality of images. The image capture unit 10 is a charge coupled device (CCD), a complementary metal oxide semiconductor (CMOS), an event data recorder (EDR), or a camera, etc. The processing unit 20 receives the images from the image capture unit 10 and stores the images in the storing unit 30, and conducts an image processing to the images. The storing unit 30 is used for storing the images captured by the image capture unit 10. The storing unit 30 is a disk or other kinds of electronic storage device for storing programs or data, and it further stores a predetermined facial information. The predetermined facial information is an coding sequence pre-stored in the storing unit 30, wherein every codes represents to a kind of mouth movement in a unit time; therefore the predetermined facial information represents designated specific mouth movements or lip languages.

The processing unit 20 includes an image background removal module 21, a feature location module 22, and a comparator 23. The image background removal 1 module 21 is for determining the human face in the images, acquiring the facial image and removing other unnecessary image data such as the background, thus, the range of image is reduced and thereby enhancing the identifying efficacy. The technology of human face determination is well-known in the arts and it is not necessary to restate herein. The feature location module 22 comprises image processing algorithms, such as light dimming, contrast adjustment, edge sharpening, despeckling and image comparison. The feature location module 22 determines the location of a pair of nostrils in the facial image, estimates a mouth searching frame based on the location of nostrils, and adjusts the contrast of the image in the mouth searching frame to acquire a data of mouth movements. The data of mouth movements is a coding sequence generated by successively mouth movements of user. The comparator 23 is for comparing the data of mouth movement and the predetermined facial information to confirm the intention of the user. If the two data are matched, the comparator 23 generates a designated signal. The designated signal is a respond message which corresponds to the situation represented by the predetermined facial information. Additionally, the device for generating signal by detecting facial movement 100 further includes a signal transmitting unit 40 for receiving the designated signal generated from the comparator 23 and transmitting the designated signal to a designated device 50. The signal transmitting unit 40 is a Wi-Fi module, a mobile communication module or other devices which are capable to transmit signal to outside. For instance, a coding sequence of the designated signal is predefined to represent the condition of a vehicle breakdown, and the designated device 50 is a signal receiver of an automobile service center, and the designated signal is a message which corresponds to inform the automobile service center for assistance. However, the form or usage of the designated signal is only for illustrating without restriction. There following context provides two exemplary embodiments to explain the technical content of present invention.

In the first exemplary embodiment of present invention, the recordation of opening and closing of a user's mouth in a period is the data of mouth movements. When the user opens his mouth, the facial image of the user is determined as an opening movement by the processing unit 20. Conversely, when the user closes his mouth, the facial image of user is determined as a closing movement. The processing unit 20 codes a coding sequence by the recordation of numbers of opening and closing of a user's mouth in a period and the time of the opening and closing. The coding sequence composes the data of mouth movement. The coding sequence is coded in a binary code way or a Morse code way. For example, if the image of mouth opening movement is defined as "1", and the image of mouth closing movement is defined as "0", and if a user opens his mouth in two unit times and closes it in another two unit times, then the coding sequence will be (1,1,0,0). The processing unit 20 compares the designated data with the data of mouth movement by the comparator 23, and if the results of comparison match, then the comparator 23 sends the designated signal to the signal transmitting unit 40, and the signal transmitting unit 40 transmits the designated signal to the designated device 50. Therefore, the user can just open or close his mouth corresponding to the designated coding of the mouth movement, and the device for generating signal by detecting facial movement 100 generates the corresponding designated signal, thereby achieving the purpose of generating signal by the facial image detecting.

In the second exemplary embodiment of present invention, the data of mouth movement represents a specific successive mouth movements or lip languages. The designated data stored in the storing unit 30 is a default lips shape coding sequence. The processing unit 20 compares the lips shape coding sequence with the default lips shape coding sequence to see whether they are matched, thereby determining the intention of the user via the data of mouth movement. For example, when user says "help me", then the image of the user is captured by the image capture unit 10 and transmitted to the processing unit 20. The facial image of user is extracted by the image background removal module 21 of the processing unit 20, and the data of mouth movement is acquired by the feature location unit 22 of the processing unit 20. The data of mouth movement is then compared with the designated data by the comparator 23. Therefore, the mouth movement of the user matches the predetermined facial information which represents "help me" and the processing unit 20 transmits the designated signal to the signal transmitting unit 40 thereby transmitting the designated signal to a designated device 50 to achieve the purpose of generating signal by detecting facial movement.

Additionally, the device for generating signal by detecting facial movement 100 further comprises a global positioning system (GPS) module, and the GPS module acquires a location information of the present position of the user through satellites. After the signal transmitting unit 40 transmits the designated signal, the GPS module transmits the location information through the signal transmitting unit 40 at the same time, therefore the staff nearby the designated device 50 can acquire the position of the user accurately and immediately. The device for generating signal by detecting facial movement 100 further includes an on-board diagnostics (OBD) that records a driving information. When the signal transmitting unit 40 transmits the designated signal, the OBD also transmits the driving information through the signal transmitting unit 40. The OBD records the vehicle information when driving, such as air displacement, condition of fuel system or fault codes, etc. Therefore, the staff nearby the designated device 50 can know the condition of the vehicle and get necessary preparation in advance.

The device for generating signal by detecting facial movement 100 further includes a video recorder (not showed) that records a video of an interior and/or exterior of a vehicle after the signal transmitting unit 40 transmits the designated signals. Or, the video recorder successively records the video, but it only preserves a part of video (such as preserves the video five minutes before the designated signal transmitted) to effectively utilize the memory space, and ensure finding the causes of the accident.

In addition, the device for generating signal by detecting facial movement 100 further includes an alarm unit (not shown), and the processing unit 20 includes a wink counting module 24 which is able to find the eyes position of the image, and to determine the opening and closing of eyes to obtain the number of winks. If the number of winks in a stipulated time surpasses a first threshold value, the alarm unit sends out a warning. The first threshold value is the upper limit of the number of winks under a normal condition in a stipulated time. If the number of winks surpasses the first threshold value, it means that the user may lose his attention because of fatigue thereby triggering the alarm unit to warn. The processing unit 20 further includes a face truing detecting module 25, which detects the facial image to determine whether the user turns his face, and also detects the angle of the face turning. If the angle of face turning surpasses the second threshold value in a stipulated time, the alarm unit sends out a warning. The second threshold value is the upper limit of face turning angle, and if the face turning angle of the user surpasses the second threshold value, it represents that the user may lose his attention because the user turns his head significantly to see other views, thereby triggering the alarm unit to warn.

For further illustration of the efficacy of the present invention, an application of the present invention is provided as follows. The device for generating signal by detecting facial movement 100 is installed in a vehicle, such as a car, a boat or a private aircraft. Taking a car for an example, the image capture unit 10 is installed in a car to capture a driver's facial image. If the driver is stuck in a car accident, the driver can make mouth movements so that the device 100 generates a designated signal and the designated signal is transmitted to the designated device 50. The designated signal is a text massage or a pre-recorded sound recording to express the intention of the user. The designated device 50 is a base station, an automobile service center, a security center, or an emergency contact, etc.

There following illustrates the method of the present invention. Please refer to FIG. 3, which shows a flow chart of the method for generating signal by detecting facial movement of the present invention. The method includes at least the following steps.

Figure 3:
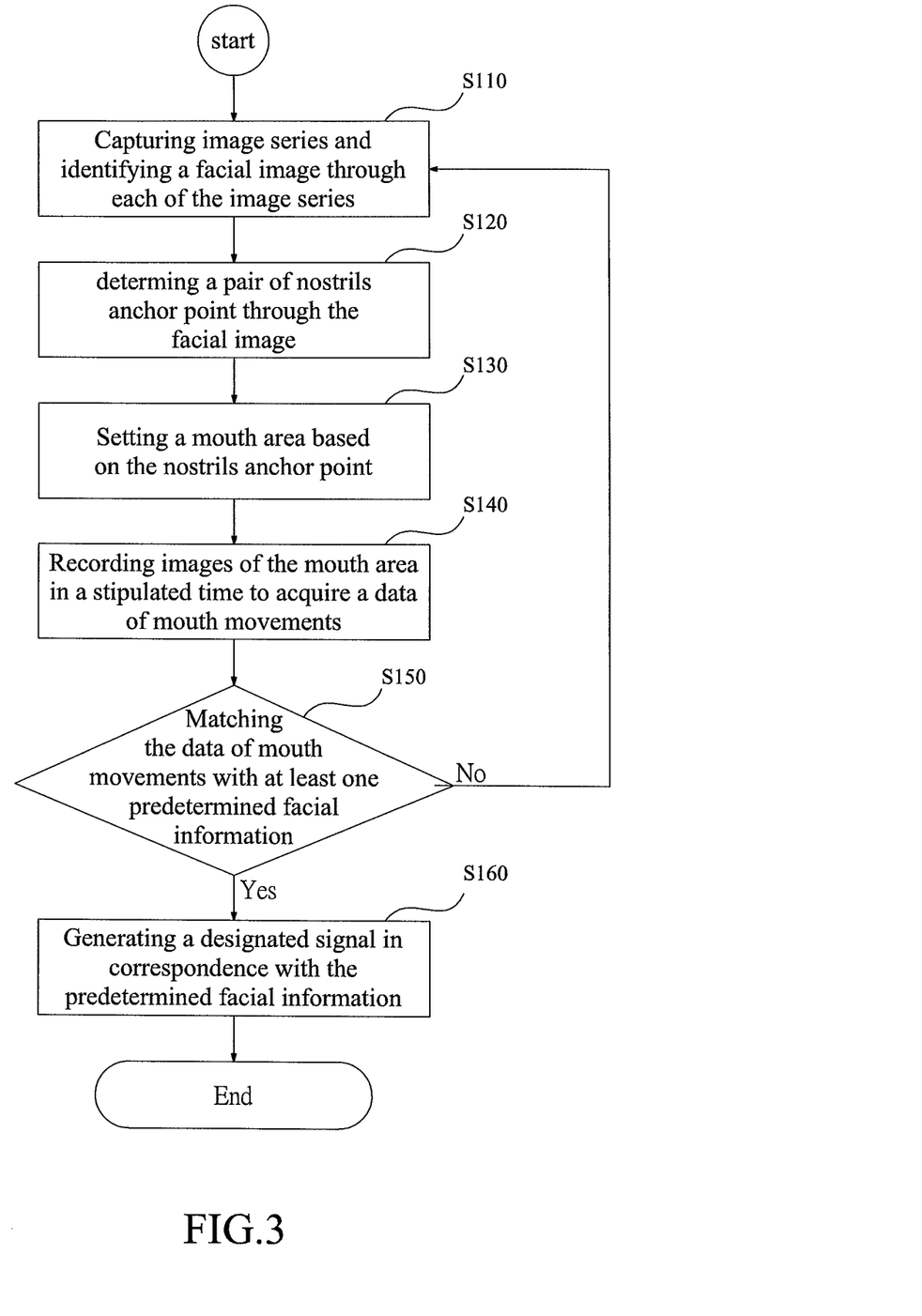
FIG. 3 shows a flow chart of the method for generating signal by detecting facial movement of the present invention.

The first step is to successively capture an image series, and to identify the images by color, shape, etc., so that a facial image is recognized (S110). Then, the second step is to determine a pair of nostrils anchor point through the facial image (S120). It is because that most people's nostrils have the similar shape and color, thus the position of nostrils is very suitable to be an anchor. The next step is to set a mouth area based on the nostrils anchor point (S130). In particular, a mouth searching frame is established having a distance below the nostrils anchor point, and the mouth searching frame is a horizontal and narrow rectangle to match the shape of lips. The image processing unit 22 removes the unnecessary parts, extracts the mouth area, and records the images of the mouth area in a stipulated time to acquire a data of mouth movements (S140). In the stipulated time, the image of the successive mouth movements of the user are divided into a plurality of images, wherein each image represents the movement of mouth in a unit time, and each of the mouth movements corresponds to a designated code. As mentioned above, the data of mouth movement is a coding sequence generated by the mouth opening or closing or lip languages of the user. For example, the unit time is 0.5 second, and the length of the coding sequence is 16 codes, so that the stipulated time is 16×0.5=8 seconds. The stipulated time and the unit time is adjustable without restriction. Finally, the data of mouth movements is compared with at least one predetermined facial information (S150), wherein when the data of mouth movements matches the predetermined facial information, then a designated signal corresponding to the predetermined facial information is transmitted (S160).

Figure 4:
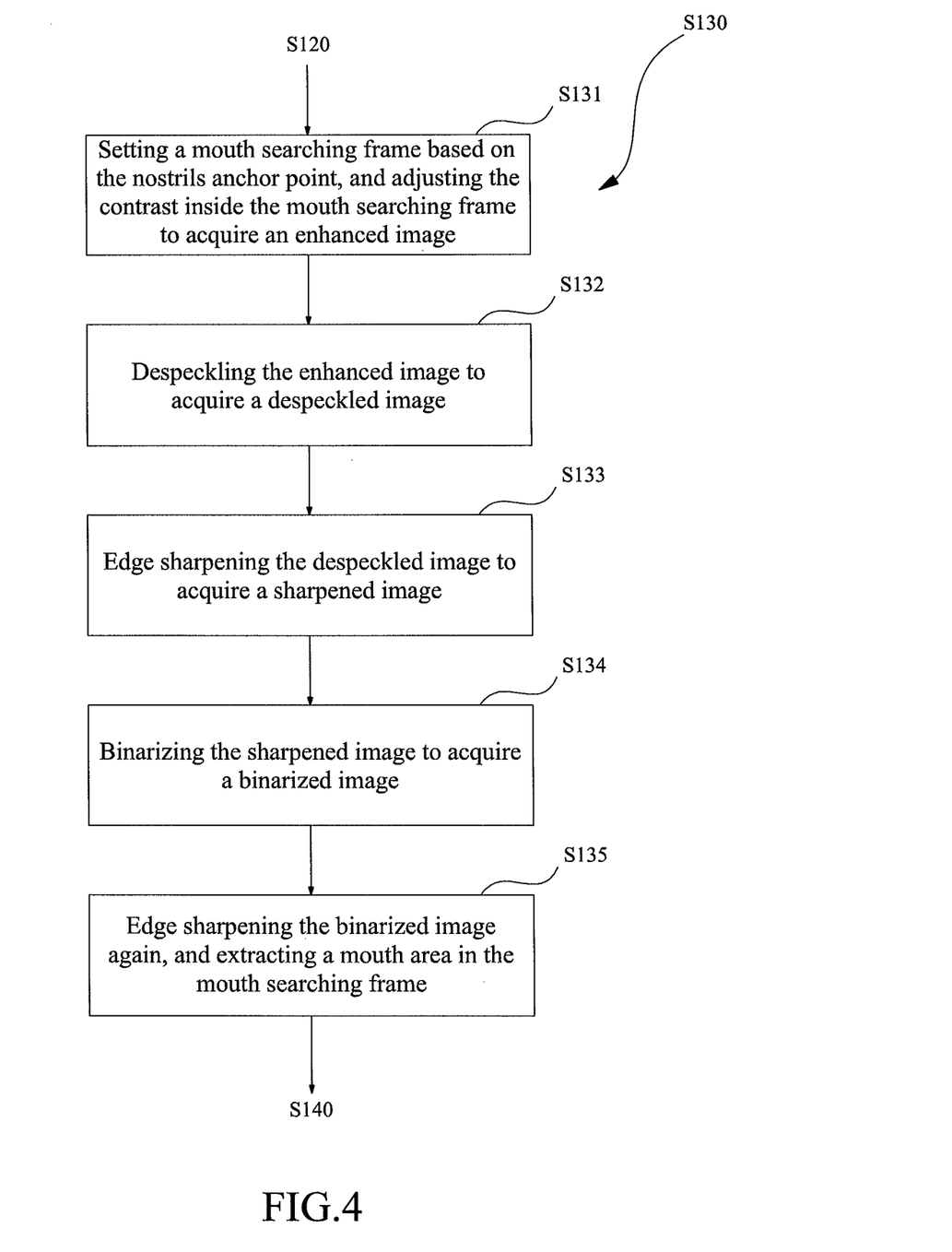
FIG. 4 shows a flow chart of the method for extracting the mouth area of the present invention.

Please refer to the FIG. 4, which shows a flow chart of the method for extracting the mouth area of the present invention. As the figure shows, the first step is to set a mouth area based on the nostrils anchor point; in particular, the contrast of mouth searching frame is adjusted to acquire an enhanced image base on the color difference of lips, skin and teeth (S131). Further, a despeckling process, such as using pixel matrix, is executed to the enhanced image to remove the speckle and acquire a despeckled image (S132). Then, an edge sharpening is executed to the despeckled image according to the contrast between two different colors to decide the boundary of the despeckled image and thereby acquiring a sharpened image (S133). Because the complexity of an image affects the file size of the image, so binarizing the sharpened image is conducted to acquire a binarized image to enhance the efficacy of comparison. A threshold shall be defined before the binarizing process, and the pixels of the image are divided into two groups, one surpasses the threshold and the other is lower than the threshold, thereby obtaining a binarized image (S134). Finally, the edge sharpening is executed again to the binarized image, and a mouth area in the mouth searching frame is extracted (S135). However, the method for acquiring the mouth searching frame is only for illustrating without any limitation to the present invention.

Figure 5:
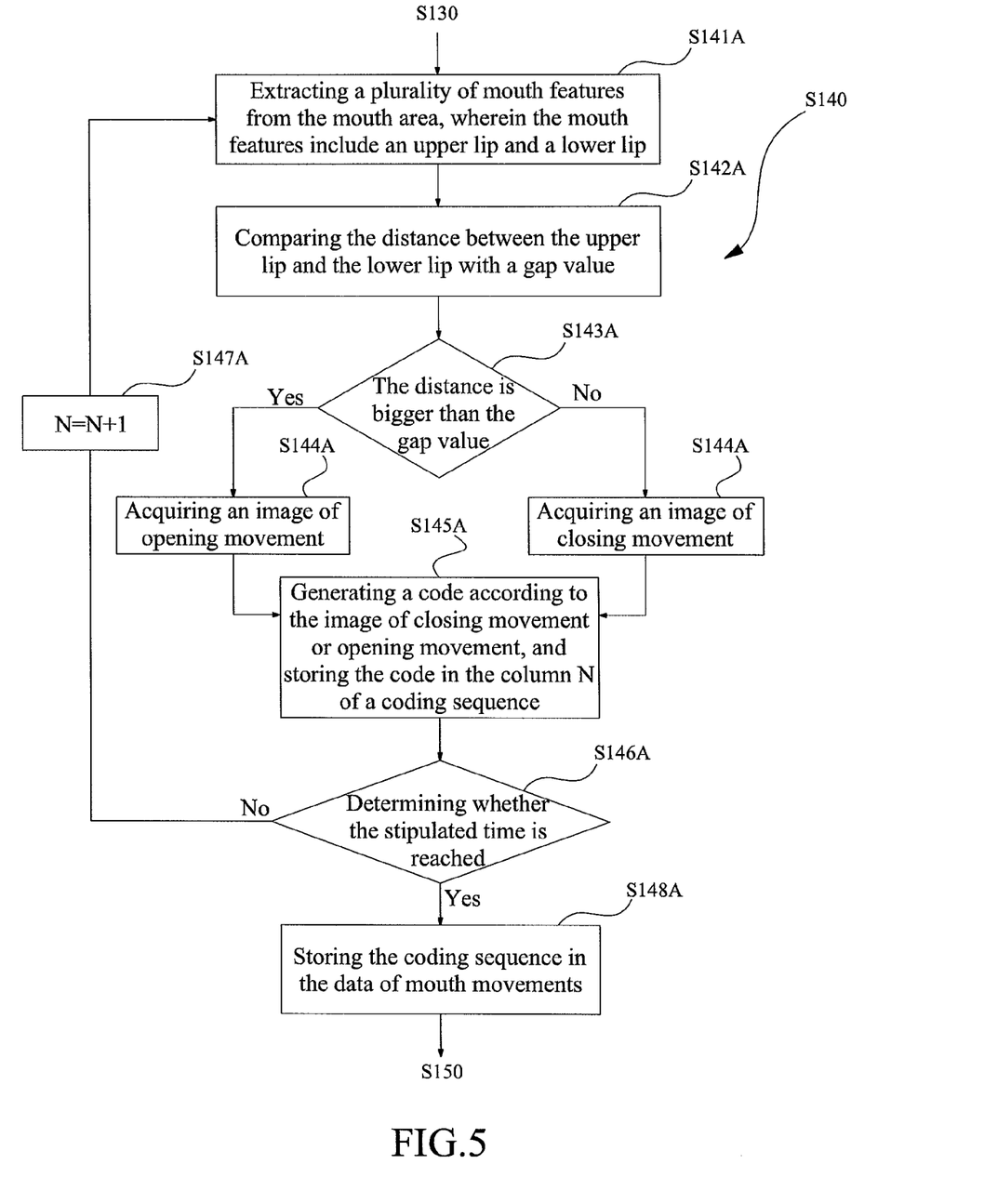
FIG. 5 shows a flow chart of the method of the first exemplary embodiment of acquiring the moth movement of the method of the present invention.

Please refer to FIG. 5, which shows a flow chart of the method of the first exemplary embodiment of the present invention. As the figure shows, the first step is to record images of the mouth area in a stipulated time to acquire a data of mouth movements. In order to acquire the data of mouth opening and closing, it is needed to extract a plurality of the mouth features in advance. The mouth features includes an upper lip and a lower lip (S141A). In particular, the method of extracting the mouth feature is achieved by finding the boundary of the left and right side of the mouth area, and defining the left corner and the right corner of mouth. Similarly, by finding the contour of the upper and lower of the mouth area, the upper lip and the lower lip can be identified with the combination of the left corner and right corner of the mouth. The next step is to compare the distance between the upper lip and the lower lip with a gap value (S142A), and if the distance is bigger than the gap value, an image of opening movement is acquired (S143A) representing the opening mouth of the user, and an image of opening movement is acquired. Conversely, an image of closing movement is acquired (S144A). A code is then generated according to the image of opening movement or the image of closings movement, and the code in a column N of the coding sequence is stored (S145A). The next step is to determine whether the stipulated time is reached (S146A). If the stipulated time is not reached, then the N=N+1 is made (S147A) and the process returns to the step 141A to determine the mouth opening or closing, and the next generated code will be stored to the next column in the coding sequence. Wherein each N column represents a unit time, and the code stored in the columns represents the facial image at the unit time. Actually, a delay time can be inserted to the whole process of step 141A to step 147A so that the processing time equals to a unit time thereby achieving the goal that each column N represents a unit time. In the end, the coding sequence is stored in the data of mouth movements (S148A).

Figure 6:
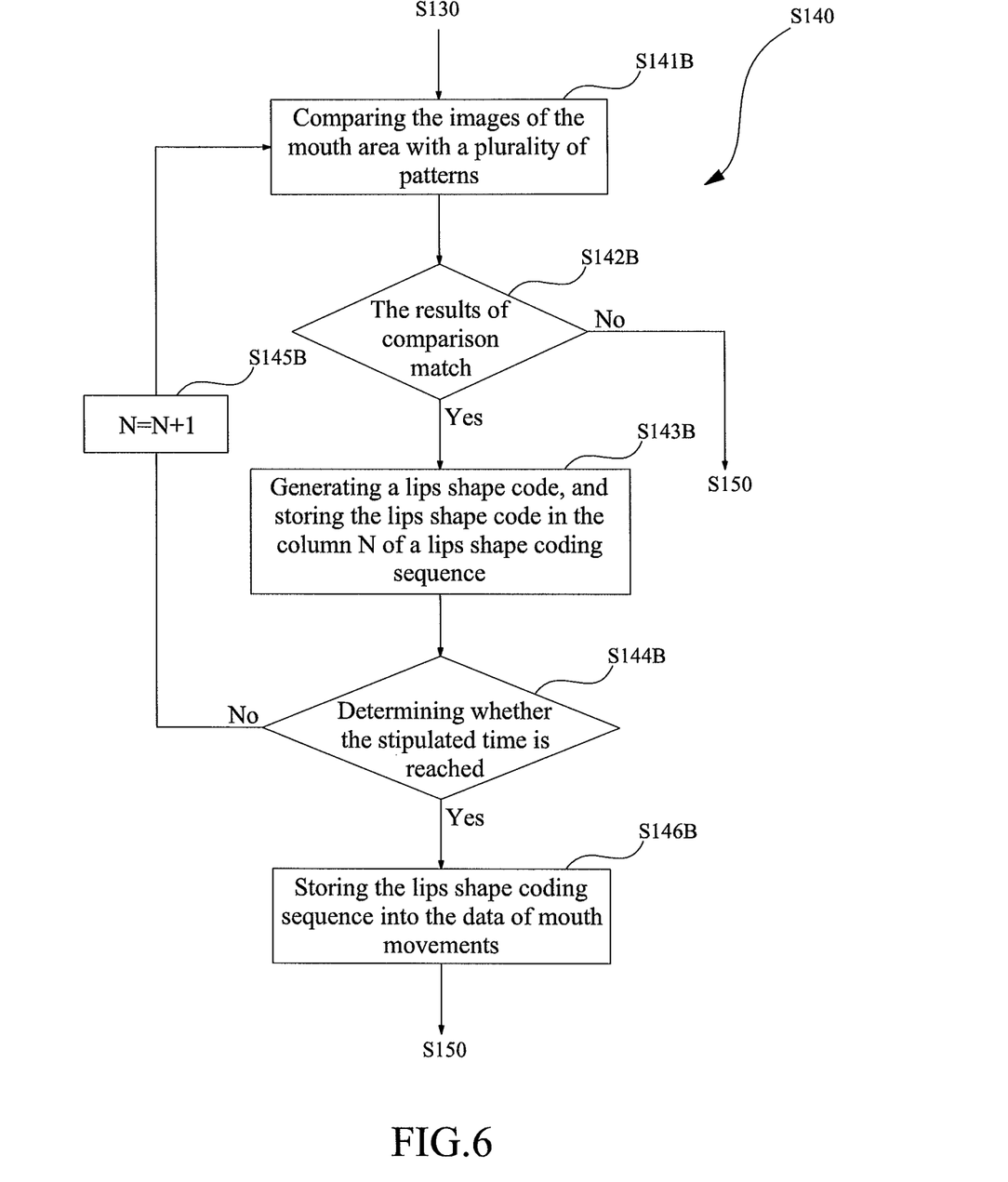
FIG. 6 shows a flow chart of the method of the second exemplary embodiment of acquiring the moth movement of the method the present invention.

Please refer to the FIG. 6, which shows a flow chart of the method of the second exemplary embodiment of the present invention. As the figure shows, in addition to the method shown in FIG. 5, the data of mouth movement also represents a combination of many kinds of mouth patterns. In the steps of recording images of the mouth area in a stipulated time to acquire a data of mouth movements, the first step is to compare the images of the mouth area with a plurality of patterns which are stored in the storing unit 30 (S141B). If the results of comparison match (S142B), a lips shape code is generated and is stored into the column N of a coding sequence (S143B). The next step is to determine whether the stipulated time is reached (S144B), if the stipulated time is not reached, then N=N+1 (S145B) is made and the process returns to the step S141B. When the stipulated time is reached, the coding sequence is stored to the mouth movements (S146B). The pattern is a designated mouth movements or lip language having identifiability, such as the mouth movements presented while user reads the vowels "a, i, u, e, o" in Japanese. The patterns have a variable tolerance; therefore, even though the mouth pattern of the facial image has a tiny difference with the patterns, if the difference is in a tolerable range, then the mouth pattern of the facial image is still recognized to be a lip shape code corresponding to the pattern. Therefore, the designated signal pre-stored in the storing unit 30 is at least one default lip shape sequence which is sorted by the patterns, and each of the default lip coding sequence corresponds to a designated signal. When a user is coerced, the user can recite "help me" by mouth movement without sound, and the user can generate a distress signal with this unnoticeable way and the signal transmitting unit 40 transmits the designated signal to the security.

In additional, the steps of the method of the present invention can be stored in a non-transitory computer-readable recording medium for implementing. The computer-readable recording medium is a floppy disk, a CD-ROM, a hard disk or other electronic storage medium, and the computer-readable recording medium is accessible and is executed on an electronic device which is able to read the computer-readable recording medium. In particularly, the electronic device is a small portable electronic device, an event data recorder, a driving security assisting device, an ODB in vehicle, computer equipment or other devices.

In conclusion, the device for generating signal by detecting facial movement of the present invention can capture an image series, transmit the images to the processing unit, extract the facial image of user by the image background removal module, and set the mouth searching frame through the feature location module to acquire the data of mouth movement. Then the data of mouth movement is compared with the designated signal through the comparator. If the results of the comparison match, then the designated signal corresponding to the predetermined facial information is transmitted to the designated device, thereby achieving the purpose of generating signal by detecting the facial image. Additionally, if the device for generating signal by detecting facial movement is installed in vehicle, such as a car, it further transmits the present location of user and the driving information provided by the GPS and OBD, so that the staff nearby the designated device can obtain the condition immediately. Furthermore, the video recorder records the video of environment; it is helpful for figuring out the cause of accident or another event. Additionally, the present invention determines the number of winks and the angle of face turning, and compares them with the first threshold value and the second threshold value respectively. If the number of winks or the angle of face turning surpasses the threshold values, it means that the user losses his attention thereby triggering the alarm unit to warn.

While the present invention has been described in connection with certain exemplary embodiments, it is to be understood that the invention is not limited to the disclosed embodiment, but, on the contrary, is intended to cover various modifications and equivalent arrangement include within the spirit and scope of the appended claim, and equivalent thereof.

What is claimed is:

1. A method for generating a signal by detecting facial movement, which is executed in an electronic device, wherein the method comprises the following steps:
    capturing an image series, and identifying a facial image through each of the image series;
    determining a pair of nostrils anchor point through the facial image;
    setting a mouth area based on the nostrils anchor point;
    recording images of the mouth area in a stipulated time to acquire a data of mouth movements; and
    comparing the data of mouth movements with at least one predetermined facial information, wherein when the data of mouth movements matches the predetermined facial information, generating a designated signal in correspondence with the predetermined facial information;
    wherein the step of recording images of the mouth area in a stipulated time to acquire a data of mouth movements includes:
    extracting a plurality of mouth features from the mouth area, wherein the mouth features include an upper lip and a lower lip;
    comparing the distance between the upper lip and the lower lip with a gap value;
    if the distance is bigger than the gap value, acquiring an image of opening movement;
    if the distance is smaller than the gap value, acquiring an image of closing movement;
    generating a code according to the image of closing movement or opening movement, and storing the code in the column N of a coding sequence;
    determining whether the stipulated time is reached; and
    storing the coding sequence in the data of mouth movements.

2. The method of claim 1, wherein the step of setting a mouth area based on the nostrils anchor point includes:
    setting a mouth searching frame based on the nostrils anchor point, and adjusting the contrast inside the mouth searching frame to acquire an enhanced image;
    despeckling the enhanced image to acquire a despeckled image;
    edge sharpening the despeckled image to acquire a sharpened image;
    binarizing the sharpened image to acquire a binarized image; and
    edge sharpening the binarized image again, and extracting a mouth area in the mouth searching frame.

3. The method of claim 1, which further includes a step after generating the designated signals:
    transmitting the designated signal to a designated device through a signal transmitting unit; wherein
    the signal transmitting unit includes a mobile communication module or a Wi-Fi module installed in a vehicle, and wherein the designated device includes a base station, an automobile service center, a security center, or an emergency contact.

4. The method of claim 3, which further provides a global positioning system module that transmits a location information to the designated device through the signal transmitting unit after the signal transmitting unit transmits the designated signals.

5. The method of claim 3, which further provides an on-board diagnostics (OBD) that records and transmits a driving information to the designated device through the signal transmitting unit after the signal transmitting unit transmits the designated signals.

6. The method of claim 3, which further provides a video recorder that records a video of an interior and/or exterior of the vehicle after the signal transmitting unit transmits the designated signals.

7. A non-transitory computer-readable recording medium, which stores a computer-executable command and which includes the method of claim 1 that can operate on an electronic device to detect the facial movements of users for generating a signal.

8. A method for generating a signal by detecting facial movement, which is executed in an electronic device, wherein the method comprises the following steps:
　　capturing an image series, and identifying a facial image through each of the image series;
　　determining a pair of nostrils anchor point through the facial image;
　　setting a mouth area based on the nostrils anchor point;
　　recording images of the mouth area in a stipulated time to acquire a data of mouth movements; and
　　comparing the data of mouth movements with at least one predetermined facial information, wherein when the data of mouth movements matches the predetermined facial information, generating a designated signal in correspondence with the predetermined facial information;
　　wherein the step of recording images of the mouth area in a stipulated time to acquire a data of mouth movements includes:
　　comparing the images of the mouth area with a plurality of patterns;
　　if the results of comparison match, generating a lips shape code, and storing the lips shape code in the column N of a coding sequence;
　　determining whether the stipulated time is reached; and
　　storing the coding sequence into the data of mouth movements.

9. The method of claim 8, wherein the step of setting a mouth area based on the nostrils anchor point includes:
　　setting a mouth searching frame based on the nostrils anchor point, and adjusting the contrast inside the mouth searching frame to acquire an enhanced image;
　　despeckling the enhanced image to acquire a despeckled image;
　　edge sharpening the despeckled image to acquire a sharpened image;
　　binarizing the sharpened image to acquire a binarized image; and
　　edge sharpening the binarized image again, and extracting a mouth area in the mouth searching frame.

10. The method of claim 8, which further includes a step after generating the designated signals:
　　transmitting the designated signal to a designated device through a signal transmitting unit; wherein
　　the signal transmitting unit includes a mobile communication module or a Wi-Fi module installed in a vehicle, and wherein the designated device includes a base station, an automobile service center, a security center, or an emergency contact.

11. The method of claim 10, which further provides a global positioning system module that transmits a location information to the designated device through the signal transmitting unit after the signal transmitting unit transmits the designated signals.

12. The method of claim 10, which further provides an on-board diagnostics (OBD) that records and transmits a driving information to the designated device through the signal transmitting unit after the signal transmitting unit transmits the designated signals.

13. The method of claim 10, which further provides a video recorder that records a video of an interior and/or exterior of the vehicle after the signal transmitting unit transmits the designated signals.

14. A non-transitory computer-readable recording medium, which stores a computer-executable command and which includes the method of claim 8 that can operate on an electronic device to detect the facial movements of users for generating a signal.

* * * * *